US008625455B2

(12) United States Patent
Todd et al.

(10) Patent No.: US 8,625,455 B2
(45) Date of Patent: Jan. 7, 2014

(54) SYSTEM AND METHOD FOR HANDLING STREAMING MEDIA

(75) Inventors: Marc A. C. Todd, Foxboro, MA (US); James T. Welch, Mashpee, MA (US)

(73) Assignee: Ineoquest Technologies, Inc., Mansfield, MA (US)

( * ) Notice: Subject to any disclaimer, the term of this patent is extended or adjusted under 35 U.S.C. 154(b) by 1782 days.

(21) Appl. No.: 11/582,072

(22) Filed: Oct. 17, 2006

(65) Prior Publication Data

US 2008/0089239 A1 Apr. 17, 2008

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC .......................................... 370/253; 370/252

(58) Field of Classification Search
None
See application file for complete search history.

(56) References Cited

U.S. PATENT DOCUMENTS

| 5,881,222 | A | * | 3/1999 | Berry et al. ..................... 714/47 |
| 5,963,551 | A | * | 10/1999 | Minko ........................... 370/356 |
| 6,738,813 | B1 |  | 5/2004 | Reichman |
| 6,807,156 | B1 | * | 10/2004 | Veres et al. .................... 370/252 |
| 6,928,055 | B2 |  | 8/2005 | Ni |
| 7,444,418 | B2 | * | 10/2008 | Chou et al. .................... 709/231 |
| 7,548,948 | B2 | * | 6/2009 | Klemets et al. ............... 709/203 |
| 2003/0033403 | A1 |  | 2/2003 | Rhodes |
| 2004/0136327 | A1 | * | 7/2004 | Sitaraman et al. ............ 370/252 |
| 2005/0047333 | A1 | * | 3/2005 | Todd et al. .................... 370/229 |
| 2006/0153174 | A1 | * | 7/2006 | Towns-von Stauber et al. ............................. 370/356 |
| 2006/0184670 | A1 | * | 8/2006 | Beeson et al. ................ 709/224 |
| 2007/0199061 | A1 | * | 8/2007 | Byres et al. ..................... 726/11 |
| 2007/0204196 | A1 | * | 8/2007 | Watson et al. ................ 714/751 |
| 2009/0080335 | A1 | * | 3/2009 | Siminoff ....................... 370/241 |

OTHER PUBLICATIONS

Hartanto, et al., "Cumulative Inter-ADU Jitter Concept and Its Applications", 2001, pp. 531-534, Dept. of Information Engineering, The Chinese University of Hong Kong, Shatin, NT, Hong Kong; Dept. of Electrical and Electronic Engineering, University of Canterbury, Christchurch, New Zealand.

* cited by examiner

*Primary Examiner* — Jae Y Lee
(74) *Attorney, Agent, or Firm* — Brian J. Colandreo; Jeffrey T. Placker; Holland & Knight LLP

(57) ABSTRACT

A system for handling streaming media at a customer premises includes a compute engine having a customer network interface device port and a customer premises equipment port, for installation between a customer network interface device and video destination customer premises equipment. The compute engine includes a processing module configured for receiving an incoming packet stream through the network interface device port, processing the incoming packet stream to generate stream data, forwarding the stream data through the network interface device port, and forwarding the incoming packet stream through the customer premises equipment port. Particular embodiments monitor and dynamically repair the incoming stream.

29 Claims, 11 Drawing Sheets

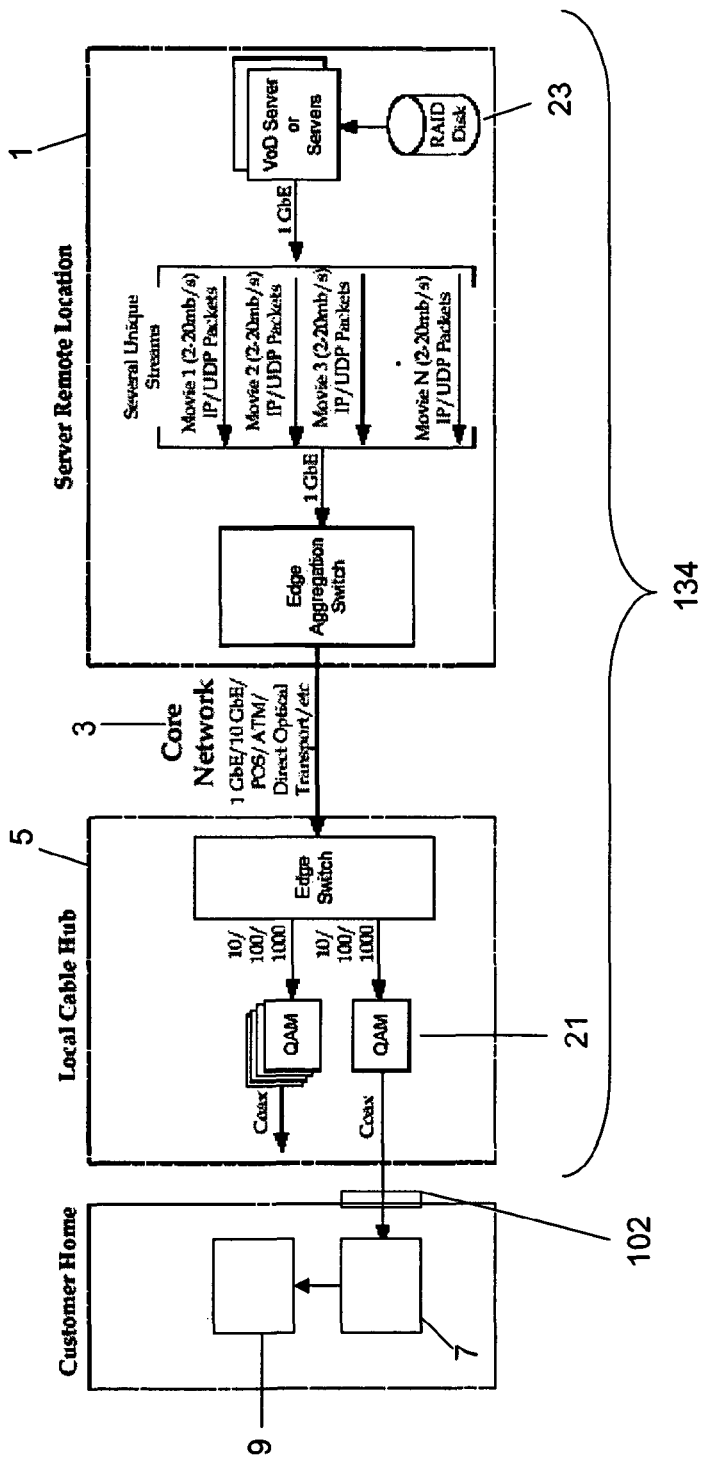
FIGURE 1A – PRIOR ART
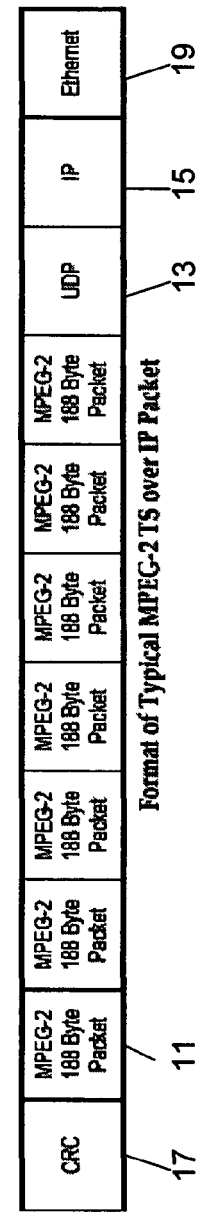
FIGURE 1B – PRIOR ART

220

SYSTEM AND METHOD FOR HANDLING STREAMING MEDIA

BACKGROUND

1. Technical Field

The present invention relates generally to the field of streaming media using Internet Protocol (IP). More specifically, the present invention is related to monitoring and/or enhancing the quality of IP streaming media as seen by an end user.

2. Background Information

Throughout this application, various publications, patents and published patent applications are referred to by an identifying citation. The disclosures of the publications, patents and published patent applications referenced in this application are hereby incorporated by reference into the present disclosure.

Streaming Video-over-IP is a technology which allows the end user to watch video content over an IP network. Examples of Video-over-IP include Video on Demand (VoD), and IPTV (Internet Protocol Television). As shown in FIG. 1A, a Video-over-IP network may include a service provider network 134 including one or more remote video servers 1, a core network (e.g., Internet) 3, and a local hub/edge switch 5, such as a CATV hub or DSLAM. This network 134 is then coupled to customer premises equipment (CPE) such as a set top box (STB) 7 and television 9 (often including various other home networking equipment), via a Network Interface Device (NID) typically located at a consumer's home. In addition to delivering streaming media to the consumer's home, the Video-over-IP technology allows the consumer to control the stream through the STB, enabling features such as channel changes (by selecting the particular stream(s) to be delivered), fast forward, pause, and rewind.

A disadvantage of conventional streaming media is that the quality of the IP stream may be degraded as it travels over the network before arriving at the end point (e.g., a consumer's television 9). Service providers may place monitors at various points along the network 134 to measure the Quality Of Service (QOS) of the streams. In this manner, service providers can relatively easily measure QOS at points between server 1 and local hub 5 to isolate network problems occurring therein. However, the QOS of ultimate concern is that experienced by the consumer at the video destination or end point, such as the consumer's television 9.

When responding to a customer complaint of poor video quality, a service provider may initially check network 134 for QOS issues. In the event an acceptable QOS is detected at hub 5, service providers generally have no choice but to send a service technician to the consumer's premises to attempt to isolate the problem within the CPE. As many QOS problems are transient, a service technician may be required to make repeated visits to a consumer's home, at various times of day, in order to locate and properly diagnose the problem(s). It has been estimated that in many instances, the total cost to a service provider of sending a service technician to a consumer's home is at least $1,000.00 per visit. The service provider's inability to remotely monitor the quality of service from outside the consumer's home thus tends to be responsible for relatively high customer service costs.

Therefore, a need exists for a relatively low cost system and method which would allow one to remotely monitor the QOS of streaming media within a user's customer premises equipment.

SUMMARY

In one aspect of the present invention, a system for handling streaming media on customer premises includes a compute engine having a network interface device port and a customer premises equipment port, in which the compute engine is configured for installation between a network interface device and video destination customer premises equipment. A processing module is configured for receiving an incoming packet stream through the network interface device port, processing the incoming packet stream to generate stream data, and forwarding the incoming packet stream through the customer premises equipment port. The processing module is also configured for receiving user data, processing the user data; and transmitting the stream data and the user data through the network interface device port to a remote location.

In another aspect of the invention, a system for handling streaming media at a customer premises includes a compute engine having a customer network interface device port and a customer premises equipment port, by which the compute engine is configured for installation between a customer network interface device and video destination customer premises equipment. A processing module is configured for receiving an incoming packet stream through the network interface device port, processing the incoming packet stream to generate stream data, forwarding the stream data through the network interface device port, and forwarding the incoming packet stream through the customer premises equipment port.

In still another aspect of the invention, a method for handling streaming media at a customer premises includes installing a compute engine having a customer network interface device port and a customer premises equipment port, between a customer network interface device and video destination customer premises equipment. The method then includes receiving an incoming packet stream from a customer network interface device port, processing the incoming packet stream to generate stream data, forwarding the incoming packet stream to a customer premises equipment port, and forwarding the stream data to the network interface device port.

In yet another aspect of the invention, an article of manufacture for handling streaming media at a customer premises includes a computer usable medium having a computer readable program code embodied therein, the computer usable medium having computer readable program code for receiving an incoming packet stream from a customer network interface device port, processing the incoming packet stream to generate stream data, forwarding the incoming packet stream to a customer premises equipment port, and forwarding the stream data to the network interface device port.

In still another aspect of the invention, a system for handling streaming media at a customer premises includes a compute engine having a customer network interface device port and a customer premises equipment port, so that the compute engine is configured for installation between a customer network interface device and video destination customer premises equipment. The system includes a processing module configured for receiving an incoming packet stream through the network interface device port, repairing the incoming packet stream, and forwarding the repaired packet stream through the customer premises equipment port.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIG. 1A is a simplified diagram of a conventional Video on Demand network;

FIG. 1B is a diagram of a conventional MPEG-2 transport stream over IP packet;

DETAILED DESCRIPTION

Figure 2:
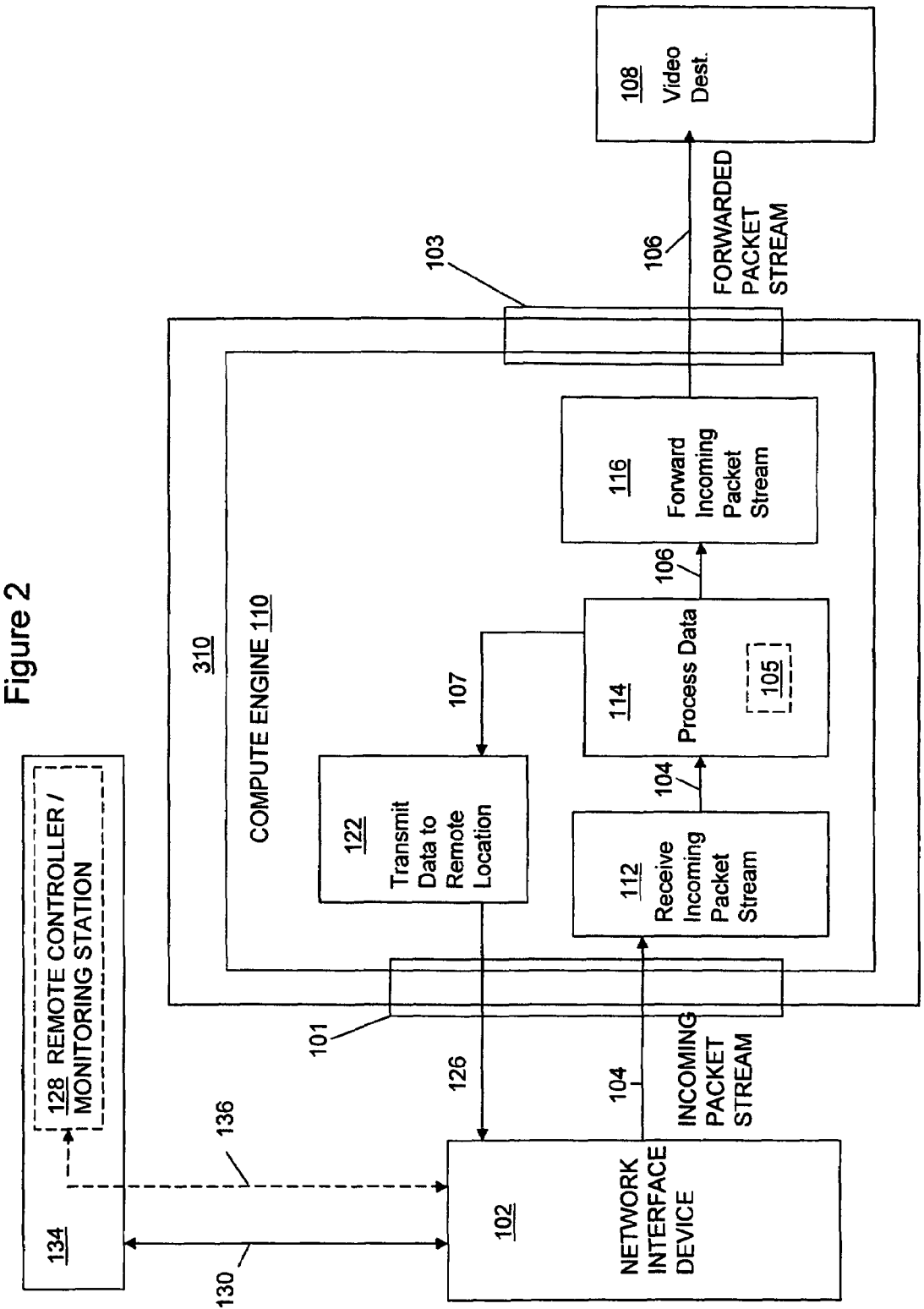
FIG. 2 is a schematic view of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Briefly described, embodiments of the present invention include a system configured for placement within a customer's local area network (LAN) or wide area network (WAN), for monitoring QOS thereat and reporting back to a remote location (e.g., to the service provider). For example, the system may be installed in line between a Network Interface Device (NID), which typically serves as a gateway between the service provider's network and the user's Customer Premises Equipment (CPE). The system receives and processes an incoming packet stream, such as by making a copy of the stream and sending the copy (e.g., via backhaul stream) to the remote location for analysis, while forwarding the original incoming packet stream to the CPE for viewing. Thus, once installed at a user's premises, the system may be used by service providers to conveniently (and remotely) identify and resolve QOS problems existing within the user's CPE.

In addition, or alternatively, the system may itself perform an analysis of the incoming stream. Exemplary methods usable by these embodiments for analyzing media streams include those disclosed in U.S. patent application Ser. No. 11/396,753, entitled System and Method for Analyzing the Performance of Multiple Transportation Streams of Streaming Media in Packet-Based Networks, filed on Apr. 3, 2006; application Ser. No. 10/604,997, entitled System and Method for Analyzing the Performance of Multiple Transportation Streams of Streaming Media in Packet-Based Networks, filed on Aug. 29, 2003; and U.S. patent application Ser. No. 11/257,183, entitled System and Method for Creating Multiple Transportation Streams of Streaming Media Network Test Traffic in Packet-Based Networks, filed on Oct. 24, 2005, the contents of which are fully incorporated herein by reference. Embodiments of the system may also take steps to remediate any detected errors in the incoming stream, such as by the use of conventional Forward Error Correction techniques.

The system may thus be conveniently installed at the user's premises upon a report by a user of a QOS problem. In this regard, because the system simply connects in-line between common network elements using standard connectors, it may be delivered to the user, e.g., via mail or overnight delivery, for self-installation. Alternatively, it may be delivered and/or quickly installed by a service technician who may happen to be in the neighborhood. Once installed, the system may monitor the media stream(s) passing therethrough for extended periods of time to enable even infrequent, transient QOS problems to be identified. The system may also be left installed at the user's premises for extended periods of time, such as in the event it is more cost effective to simply correct errors in the stream, than to address the source of the errors.

Embodiments of the invention may also capture data associated with user's actions, which may prove useful to the service provider or third party in diagnosing QOS issues and/or to otherwise enhance the customer's experience. For example, the system may capture user commands to the STB, such as channel changes, and then compute statistics associated with this captured data. For example, the system may compute and record the time elapsed between when the channel change command is entered, and when the selected channel begins streaming through the user's STB. Various other aspects of the invention will be described hereinbelow with reference to the appended Figures.

As used herein, the term NID may include any number of common gateway devices such as a Residential DSL Gateway, and a Service Area Interface. Similarly, the term CPE (customer premises equipment) includes nominally any network devices or elements and communication media located at a customer's premises, through which streaming media may flow, including Local Area Networks (LANS) formed by structured wiring (e.g., CAT5x), Wi-Fi or other wireless links, coaxial cable, telephone wiring, electrical power wiring, etc., such as may be defined by various standards organizations such as the Multimedia over Coax Alliance (MOCA), which recommends specifications for networks using coaxial cable, and the Home Phoneline Networking Alliance (HPNA), which recommends specifications for home networks using telephone jacks and telephone wire. Examples of such network devices include routers, switches, Set Top Boxes (STBs), bridges, switches, hubs, repeaters, multilayer switches, protocol converters, digital media receivers, proxies, firewalls, multiplexers, network cards, modems, ISDN terminal adapters, line drivers, and display devices such as computers, televisions, monitors, PDAs (Personal Digital Assistants), Smart Phones, and combinations thereof.

Turning now to the Figures, various embodiments of the present invention will be described in greater detail. As shown in FIG. 2, an embodiment of the present invention includes a system 310 having a video source-, or network interface device (NID)-side port 101, and a video destination-, or Set Top Box (STB)-side port 103. Port 101 is configured for communicably coupling (directly or via other network elements) to an NID 102 e.g., for receiving an incoming packet stream 104 from provider network 134. Port 103 is configured for communicably coupling (directly or via other CPE network elements) to a video destination 108 such as an STB 7, TV 9, personal computer, etc., for transmitting the incoming packet stream thereto.

The incoming stream 104 may be in nominally any desired format suitable for transmission over a packetized network. In exemplary embodiments, stream 104 is in the conventional MPEG-2 TS (Motion Pictures Expert Group-2 Transport Stream) format, such as shown in FIG. 1B. As shown, the content may be contained in a series of 188-byte MPEG-2 packets 11, which are encapsulated in a UDP (User Datagram Protocol) datagram and IP headers 13 and 15. The completed MPEG-2 TS packet includes provisions for a CRC (Cyclic Redundancy Check) 17, and the Ethernet protocol 19.

As also shown, system 310 includes a compute engine 110 communicably disposed between ports 101 and 103. Engine 110 is configured to receive 112 the incoming packet stream 104, process 114 the incoming packet stream 104, and then forward 116 the post-processing packet stream 106 to the destination 108. In addition, system 310 includes a transmission module 122 configured to communicate to an optional remote monitoring or controlling station 128, via network 134 (e.g., through port 101 and NID 102 as shown) or optionally, any other suitable communications (e.g., cellular) link 136. The data 107 generated by processing module 114 may thus be transmitted by module 122 to remote station 128 (or elsewhere) for analysis, and/or for further remedial action, etc.

As mentioned hereinabove, the processing module 114 may effect any number of operations useful in determining the QOS of incoming stream 104. For example, this processing may include calculating the MDI of stream 104. Alternatively, processing module 114 may simply make (and optionally store) a copy of stream 104 for later review and analysis. The processed data may be stored within an optional memory or database 170 (FIG. 3) for later retrieval, such as upon return of system 310 to the service provider. Alternatively, the processed/captured data may be transmitted (e.g., streamed) to a remote location or to the service provider for analysis, as will be discussed hereinbelow with reference to alternate system 310'.

Still further, streams 104 that have been identified as suffering impairments may be "repaired", such as by an optional error correction module 105 associated with processing module 114. Module 105 may thus include any of various error correction means, such as conventional Forward Error Correction (FEC) algorithms. Module 105 may then operate in concert with conventional upstream equipment which may add repair information (e.g., FEC flows), which may then be used by module 105 along with the original stream to reconstruct the unimpaired flow. FEC flows thus may be provided by the service provider in a conventional manner, e.g., using some bandwidth that may otherwise be available for other services provided to the user, such as high speed data or voice services. Error correction module 105 may then use the FEC flows to repair any impairments at the user's premises. It is expected that in many applications, repairing the streams 104 in this manner may be more cost effective than eliminating the source of the impairments, such as by replacing wiring or other facilities at the user's premises.

Embodiments of the invention may thus transmit information regarding the quality of the incoming stream to remote (e.g., upstream) locations, while simultaneously repairing the stream. Moreover, the stream repair may be effected dynamically, e.g., when the incoming stream quality drops below a predetermined threshold, as determined by either the processing module 114, or by the remote monitoring station 128. Such dynamic repair may also be used to dynamically control the FEC flow, e.g., to eliminate the FEC flow (and thus free up bandwidth for other services) when the quality of the incoming stream is satisfactory. Thus, by tracking the dynamic performance of a video flow through its Quality of Service parameters, these embodiments may request the additional repair flow dynamically and thus impact the other services only if needed. Processing options will be described in greater detail hereinbelow with respect to various optional embodiments.

Figure 3:
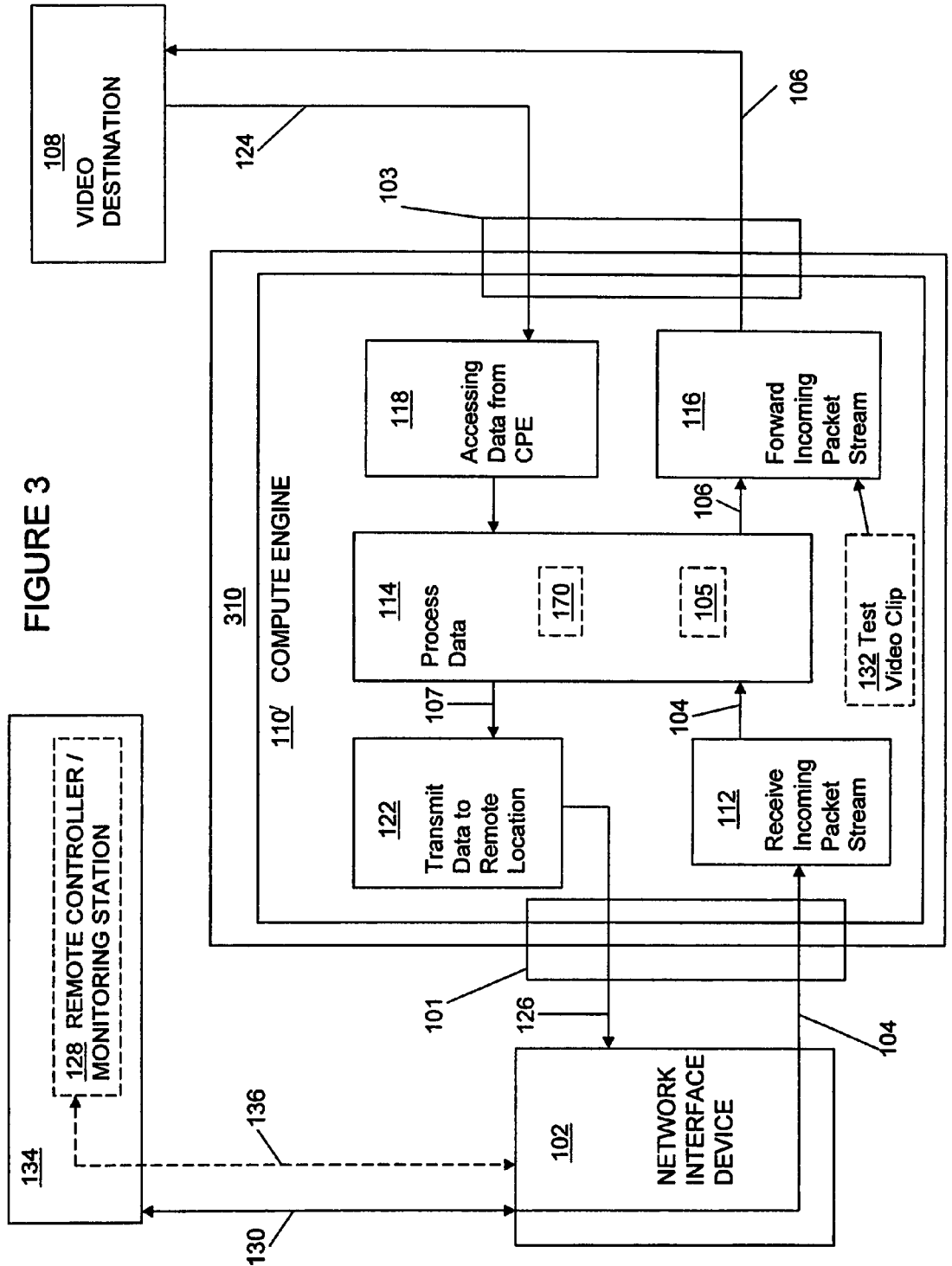
FIG. 3 is a schematic view, with optional aspects shown in phantom, of an alternate embodiment of the present invention.

Turning now to FIG. 3, an alternate embodiment of the present invention is shown as system 310', which includes the components and basic functionality provided by system 310. As a further option, compute engine 110' may capture 118 user data 124 from destination 108 (e.g., from the user's television or cable box remote control). Examples of such user data 124 include user commands such as selection of video content (i.e., channel changes) along with the delay experienced by the user from the moment he presses the channel change button on his remote to the time the channel starts streaming to STB 7 (FIG. 1A). Data 124 may also include the user's use of so-called "trick mode" commands such as rewind, fast forward, pause, stop. User data may also include a log of use of a user input device such as button 306 described hereinbelow.

This user data is processed (e.g., captured) by processing module 114, and may then be stored in optional non-volatile memory or database 170, such as in the form of a log. In addition, or alternatively, this user data may be forwarded via transmission module 122 to remote monitoring station 128 as discussed hereinabove.

While remote station 128 has been described as receiving data forwarded by transmission module 122, the communication may be two-way, or duplex, to permit data transfer to be initiated either by compute engine 110' or by station 128. For example, data transfer may be initiated by engine 110', in which data is forwarded automatically, e.g., at a predetermined interval or upon a triggering event such as receipt of a particular user command at module 114. Alternatively, or in addition, data transfer may be initiated by remote station 128, such as by polling system 310'. This polling ability may also be used to effect various other actions, such as reprogramming or rebooting system 310' remotely.

As a further option, a video test clip 132 of known quality parameters may stored within system 310' for forwarding by transmission module 116 to another system 310, 310', located within the customer's LAN (e.g., at a location closer to destination 108) as described in greater detail hereinbelow with respect to FIG. 10. The quality of the video clip 132 may then be monitored by the other system 310, 310', to help determine whether QOS problems lie in the CPE disposed between the two systems.

Figure 4:
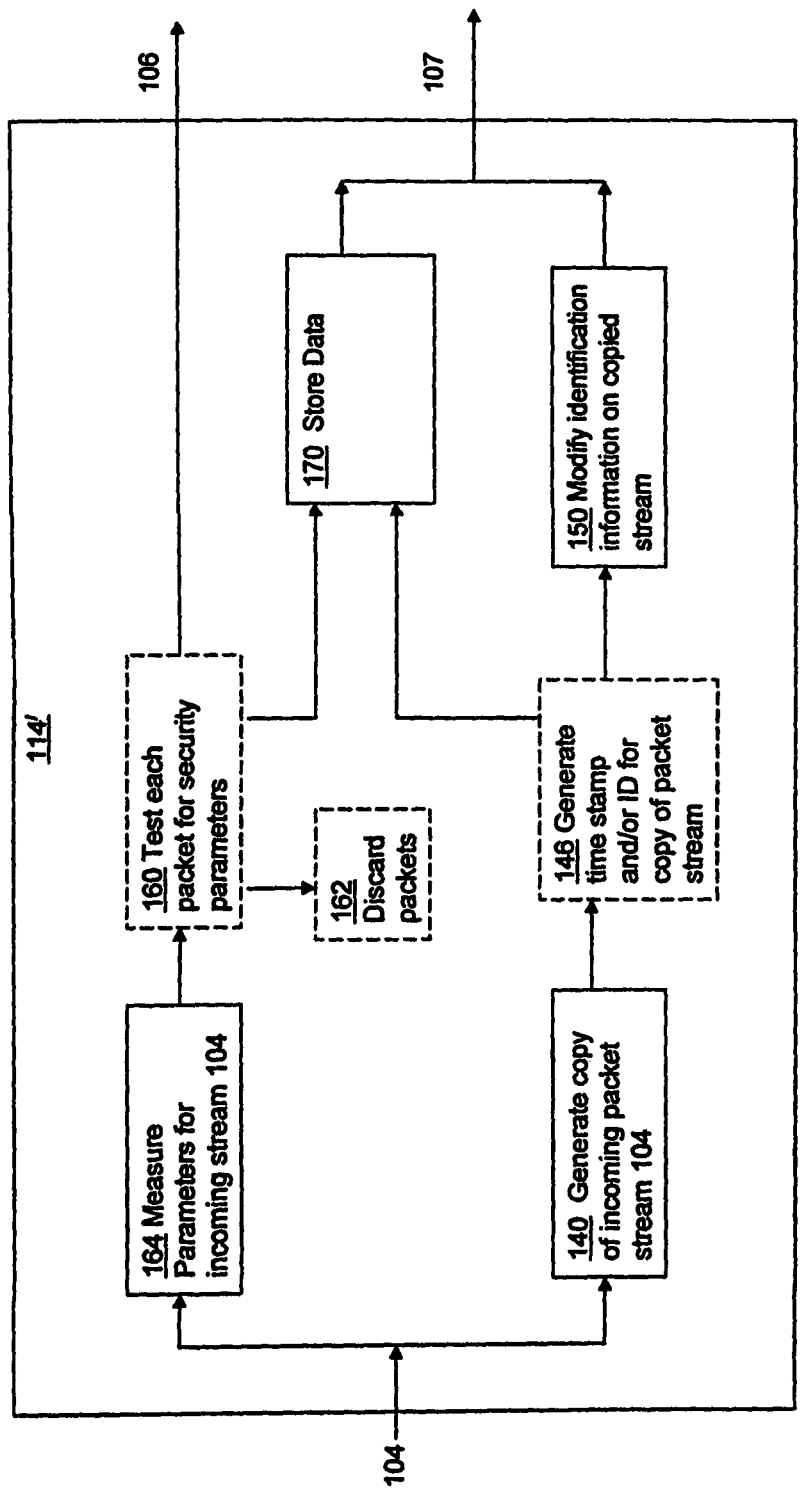
FIG. 4 is a schematic view of an alternate portion of the embodiment of FIG. 3.

Turning now to the embodiment of FIG. 4, some of the operations effected by processing module 114 are shown in detail. Parameters associated with the incoming stream 104 may be measured/analyzed 164. The parameters may include any of those parameters disclosed in Technical Report 101 290 by the European Telecommunications Standards Institute (ETSI), including the quality parameters discussed hereinbelow with respect to FIG. 5. Some of these parameters are listed in the following Table 1. Parameters listed under Priorities 1 and 2 relate to the packet stream, and parameters under Priority 3 relate to specific applications associated therewith.

TABLE 1

| Priority 1 | Priority 2 | Priority 3 |
|---|---|---|
| TS_sync_loss (Transport Stream sync loss) | Transport_error | NIT_error (Network Information Tables error) |
| Sync_byte_error | CRC_error (Cyclic Redundancy Check error) | NIT_actual_error |
| PAT_error (Program Association Table error) | PCR_error (Program Clock Reference error) | NIT_other_error |
| PAT_error_2 | PCR_repetition_error | SI_repetition_error (Service Information repetition error) |
| Continuity_count_error | PCR_accuracy_error | Buffer_error |
| PMT_error (Program Map Table error) | PTS_error (Presentation Time Stamps error) | Unreferenced_PID |
| PID_error (Packet Identifier error) | | SDT_error (System Target Decoder error) |
| | | SDT_actual_error |
| | | SDT_other_error |
| | | EIT_error (Event Information Table error) |
| | | EIT_actual_error |
| | | EIT_other_error |
| | | RST_error (Running Status Table error) |
| | | TDT_error (Time and Date Table error) |
| | | NIT_other |
| | | SDT_other |
| | | EIT_P/F_other |
| | | EIT_schedule_other |
| | | EIT_schedule_actual |

Optionally, the packets of stream 104 may be analyzed 160 for security parameters, with packets that fail to meet predetermined security parameters being discarded 162. Examples of such security parameters are listed in the following Table 2.

TABLE 2

| Authentication Header (AH): | Encapsulated Security Payload (ESP): |
|---|---|
| Next Header | Security Parameters Index (SPI) |
| Payload Length | Sequence Number; Payload Data |
| Security Parameters Index (SPI) | Padding |
| Sequence Number | Pad Length |
| Authentication Data | Next Header |
| | Authentication Data. |

Data on the measured parameters 160, 164 may be stored 166 (e.g., in optional database 170, FIG. 3) for future access, and/or forwarded at 106 to destination 108 as described above.

Processing module 114 may also generate 140 a copy of the incoming stream, as discussed above, optionally stamping 146 the copied stream, e.g., with a time stamp and/or stream identification, and storing 148 the copied stream in optional database 170 (FIG. 3) for future reference. Alternatively, or in addition, the copied stream may itself be streamed to remote monitoring station 128 by replacing 150 the destination information in the IP headers of the copied stream's packets with destination information (e.g., an IP address) associated with remote station 128. This derived stream, along with information stored in database 170, may be forwarded 107 via transmission module 122 (FIG. 3) as discussed hereinabove.

Figure 5:
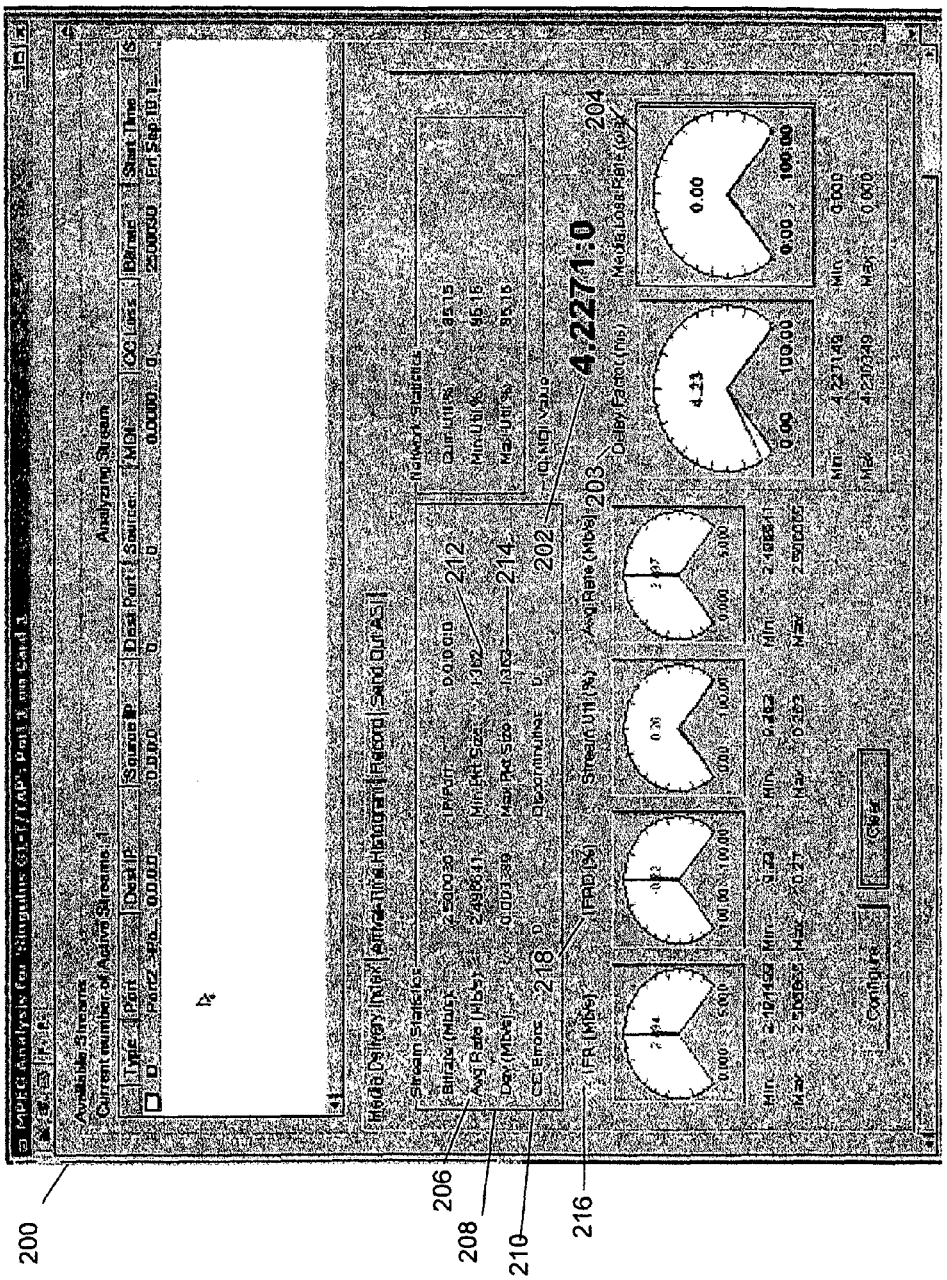
FIG. 5 is a screen display of a Graphical User Interface associated with operation of an embodiment of the present invention.

Turning now to FIG. 5, a screen display 200 generated by a graphical user interface (GUI) associated with embodiments of the invention displays some of the possible parameters measured by processing module 114, 114'. This screen 200 may be viewed in monitoring station 128 on a display 308 (FIG. 7, discussed below) within system 310, 310', and/or on a local display device such as a PDA or Smart Phone. These parameters may include the MDI value 202, which includes the Delay Factor (DF) 203 and the Media Loss Rate (MLR) 204. This information may prove valuable to a service provider. For example, if the DF 203 is high and the MDR 204 is zero, then packets have not been lost even though significant packet jitter is present on the network. If the DF 203 is low but MLR 204 indicates packet loss, then the MPEG Transport Stream may be corrupted. If the MLR 204 indicates packet loss and DF 203 is high, packets are likely being lost in the network path.

Also displayed in this embodiment are the Bitrate 206, the Average Rate 208, and the Deviation 210 (Dev) from the MPEG encoded bit rate, all in Megabytes per second (Mb/s). The Average Rate 208 indicates whether the stream conforms to the specified rate over a measure of time. A relatively large Dev 210 may indicate server configuration problems or stream encoding problems. The measured minimum packet size 212 (Min Pkt Size) and maximum packet size 214 (Max Pkt Size) may be checked to confirm that the expected packets and only the expected packets are being received. For example, an MPEG-2 constant bit stream with seven 188 byte Transport Stream packets per Ethernet packet with UDP/IP encapsulation should result in the stream's constant packet size of 1362 bytes. Packets of mixed sizes may indicate the presence of a misaddressed or non-MPEG stream. The Instantaneous Flow Rate (IFR) 216 and the Instantaneous Flow Rate Deviation (IFRD) 218 confirm a stream's nominal flow rate. As discussed above, nominally any parameters may be measured and displayed.

Figure 6:
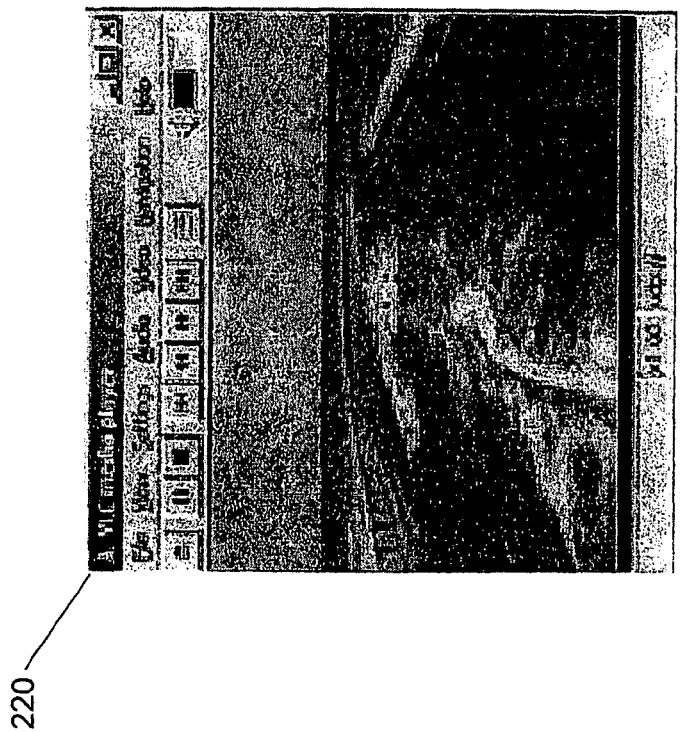
FIG. 6 is another screen display of a Graphical User Interface associated with operation of an embodiment of the present invention.

Turning now to FIG. 6, an exemplary GUI screen 220 displays the derived video stream at remote station 128, which as described hereinabove, is a copy of nominally identical quality to that passing to video destination 108.

Figure 7:
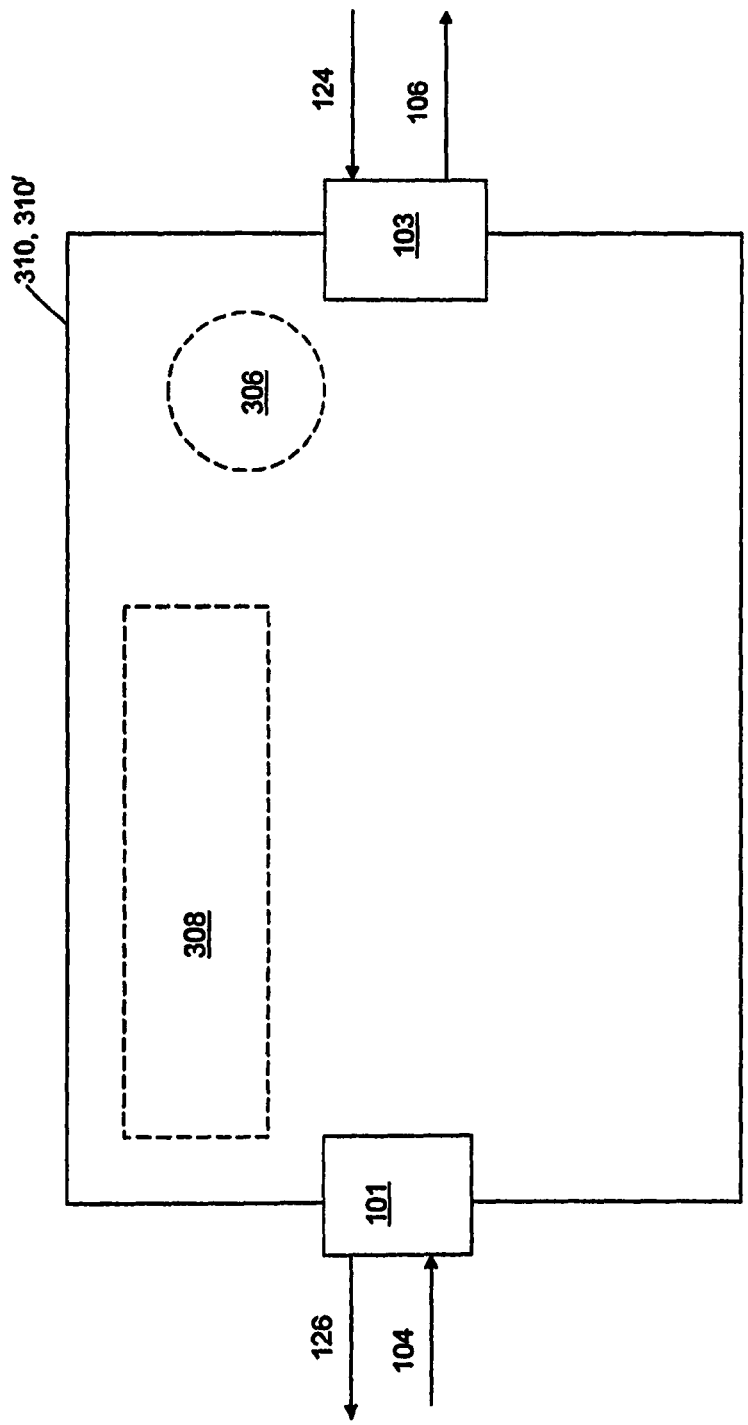
FIG. 7 is a schematic view of a representative housing for the embodiments of FIGS. 2 and 3.

Referring now to FIG. 7, system 310, 310', may be enclosed in a housing having ports 101, 103, an optional display or screen 308, as discussed above, and an optional user actuatable input device such as a button 306. This button, for example, may be actuated by the user when experiencing problems with the quality of video. The compute engine 110, 110' may store as user data, a log of the times and conditions under which the button 306 was pressed within database 170 (FIG. 3). Screen 308 may display various QOS information such as the measured quality and security parameters, allowing the user direct access to the benefits of system 310, 310'. The display screen may also be helpful in the event the user is speaking over the telephone with a service technician, who may direct the user to read the information on the display screen 308.

Figure 8:
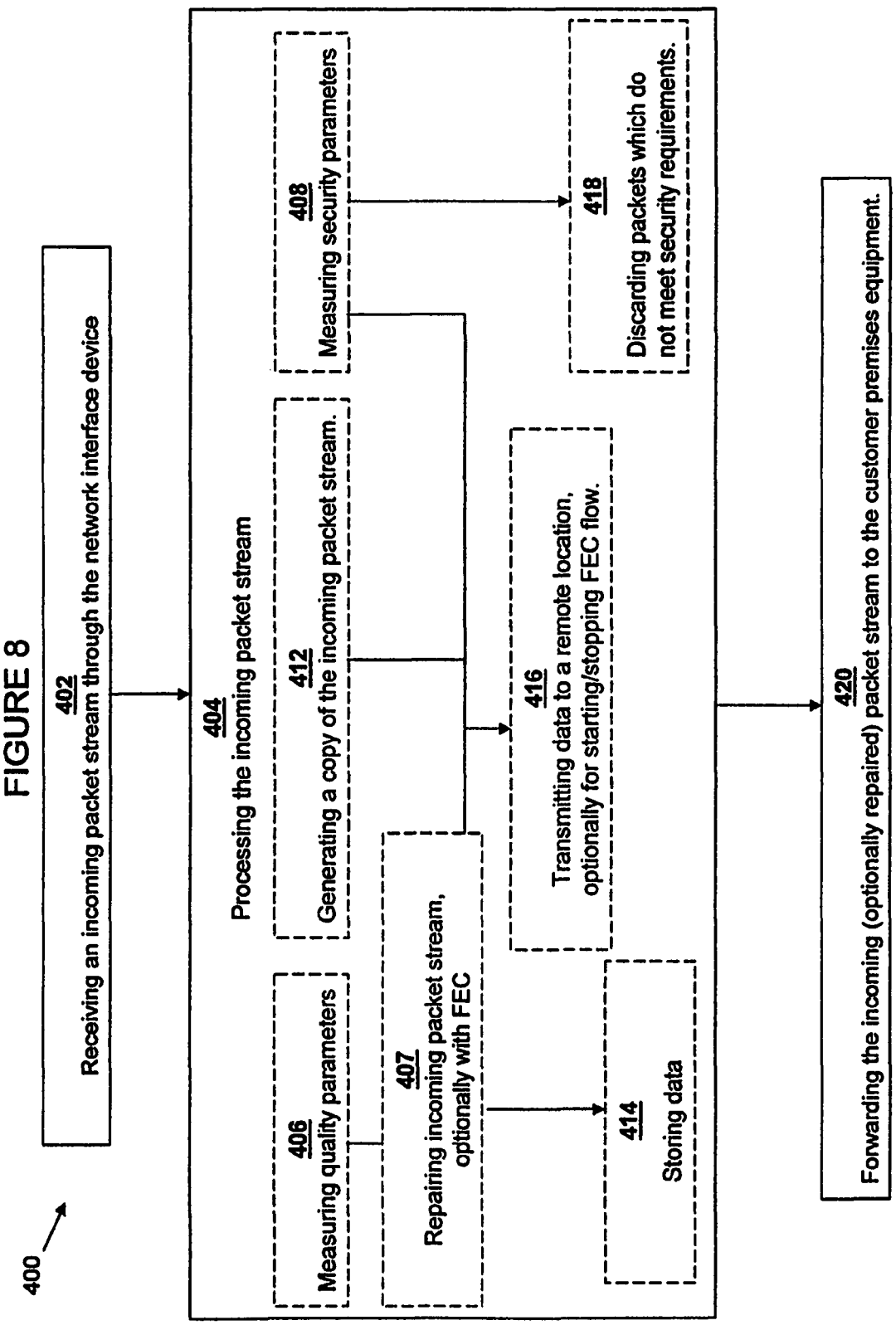
FIG. 8 is a flow chart of a method associated with embodiments of the present invention.

FIG. 8 illustrates a method of use 400 associated with an embodiment of the present invention. In step 402, an incoming packet stream is received through an NID. Next, in step 404, the received packet stream is processed. Step 404 may include the optional steps of Measuring quality parameters 406, Repairing the incoming stream 407, e.g., with FEC, Generating a copy of the incoming packet stream 412, and Measuring security parameters 408. Next are the optional steps of Storing data 414 and Transmitting data to a remote location 416, such as for dynamically signaling a service provider to start and stop the FEC as desired. The step of Measuring security parameters 408 may lead to the step of Discarding packets which do not meet security requirements 418. Step 420 includes forwarding the incoming packet stream to video destination 108 (FIG. 2).

Figure 9:
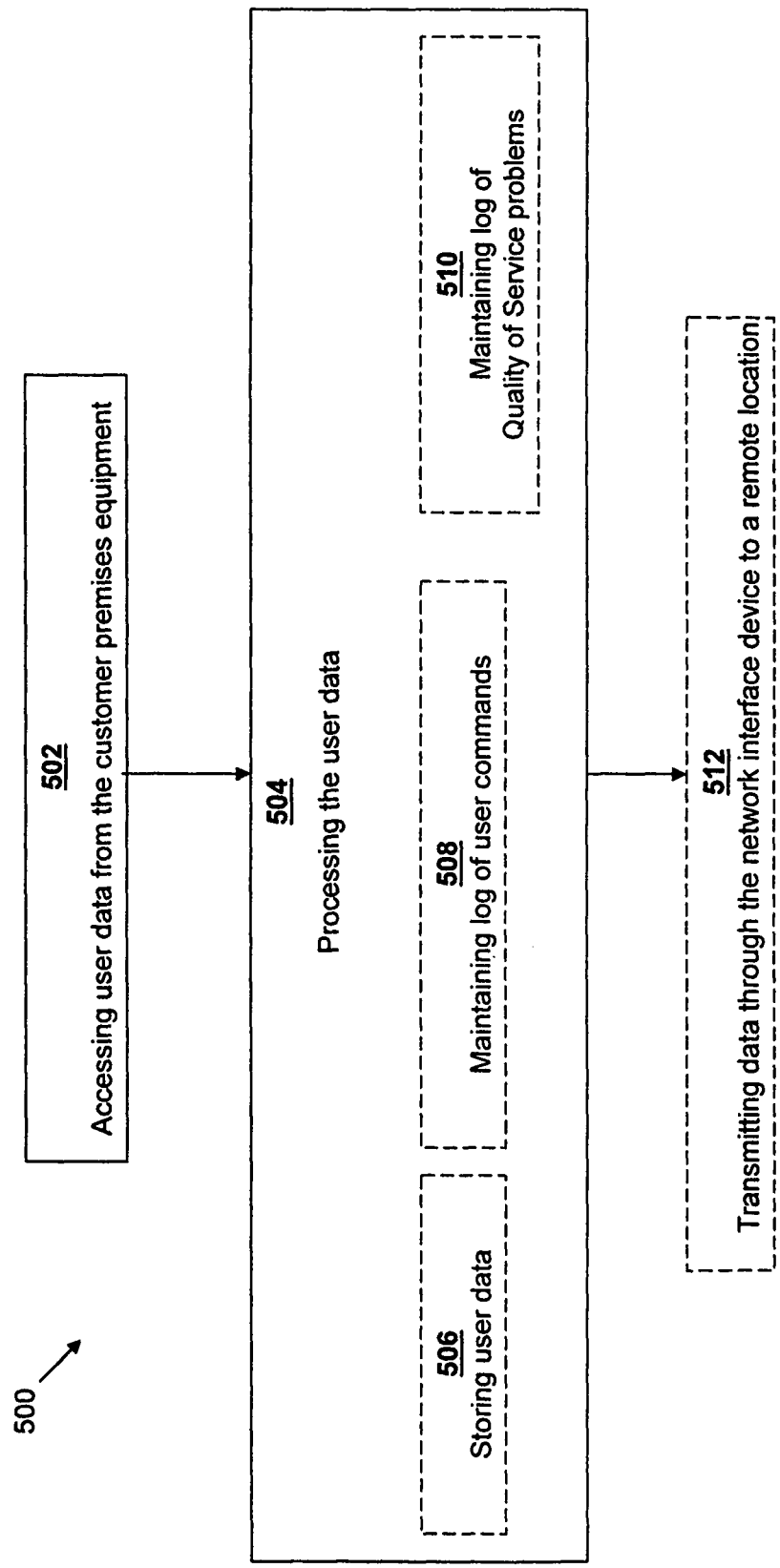
FIG. 9 is a flow chart of another method associated with embodiments of the present invention.

Turning to FIG. 9, optional method 500 associated with embodiments of the present invention includes capturing 502, user data from the customer premises equipment. The user data is then processed 504. Step 504 may include the optional steps of Storing 506 the user data, Maintaining 508 a log of user commands, and Maintaining 510 a log of QOS Problems. Data may then be transmitted 512 to a remote location.

Figure 10:
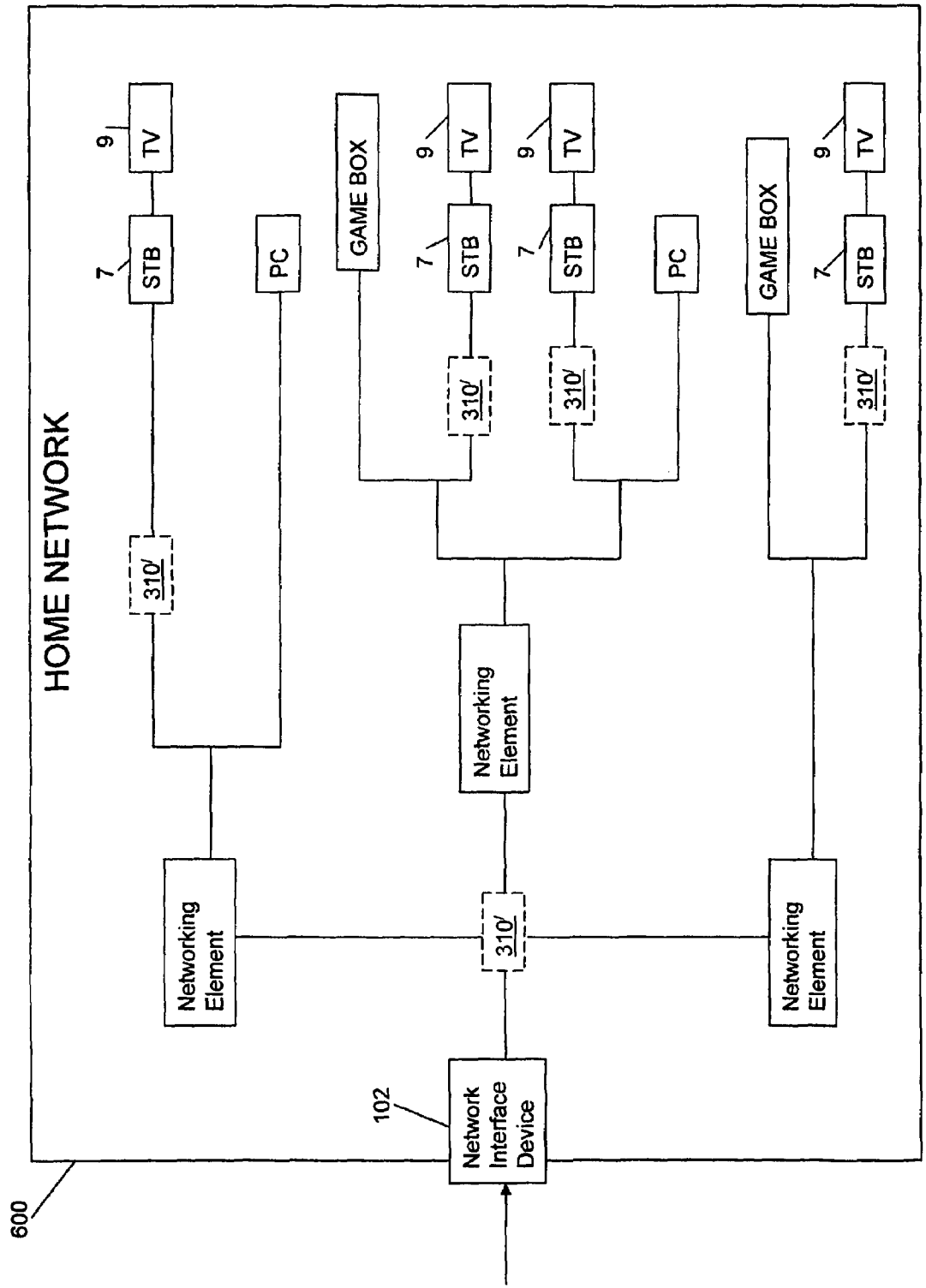
FIG. 10 is a schematic view of the embodiment of FIG. 3 deployed at multiple locations within a typical user's home network.
Figure 11:
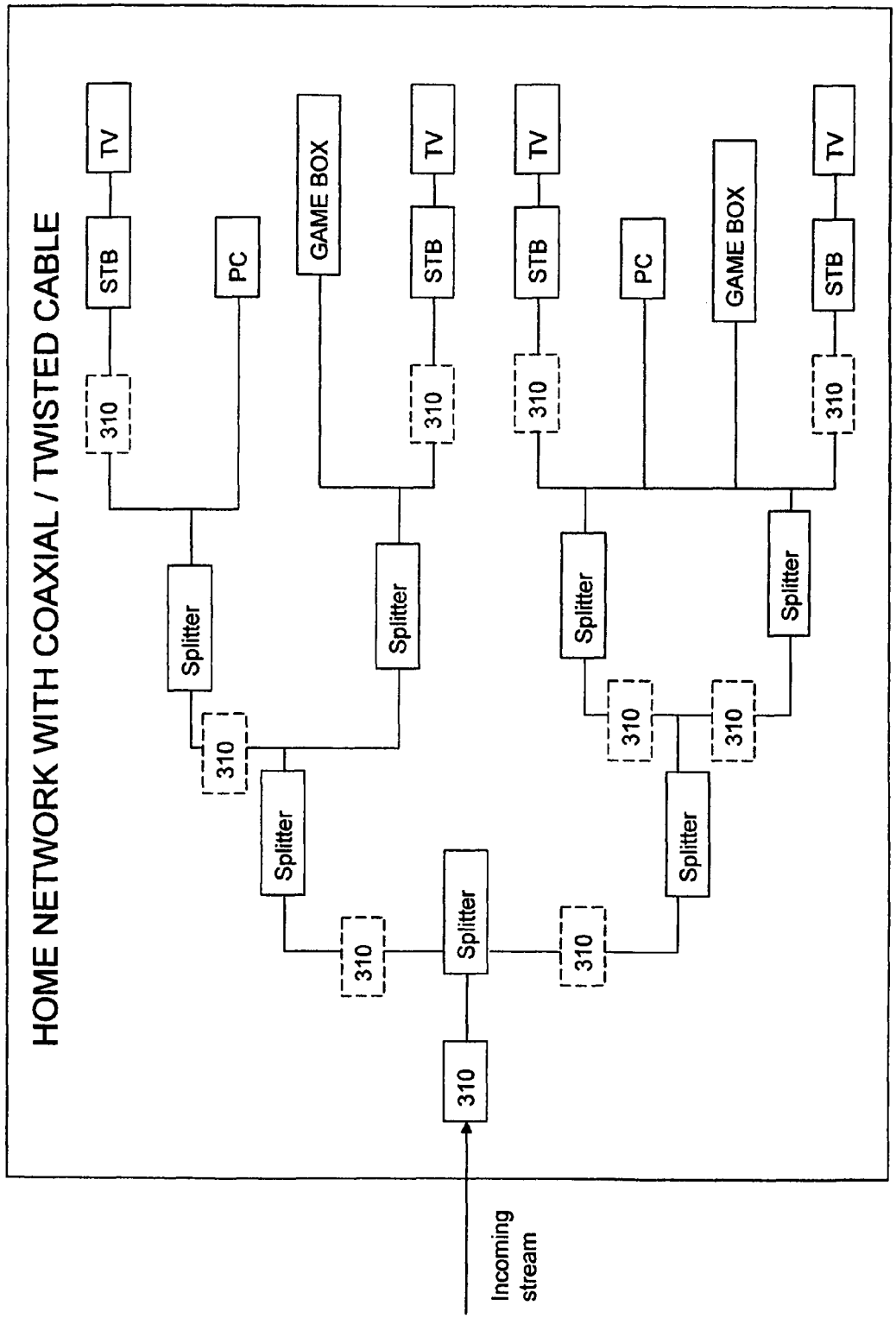
FIG. 11 is a schematic view of the embodiment of FIG. 3 deployed at multiple locations within a typical user's home network.

Referring now to FIG. 10, as mentioned above, multiple instances of system 310, 310' may be deployed at various locations within the CPE forming a user's LAN or home network 600. As mentioned hereinabove, service providers generally have no oversight on such end user's home networks, and they often include components and cabling of various types. For example, networks are often formed not only with traditional computer networking wiring, but with legacy wiring such as Coaxial cable, telephone wire, and even home power lines. Moreover, networking devices of various types, construction, and function are often connected. As such, these home networks often vary widely in quality. These networks often may not meet applicable specifications, such as the MOCA specifications recommended for coaxial cable, and the HPNA specifications for networks connected with telephone wire and telephone jacks.

It may therefore be useful to place additional systems 310, 310' at various locations, such as shown by way of example, within representative home network 600 of FIG. 10. Such placement of 310 at various points of the network may be used to pinpoint problems along the network. For example, as discussed above, an optional video clip 132 (FIG. 3) with known parameters may be sent over the home network and analyzed at various points along the network. A drop in quality between two systems 310, 310' may indicate problems with the connections or other network elements disposed therebetween. For example, shielding on coaxial cable linking Computer Networking Devices could degrade, leaving the cable prone to electrical interference. Users may have installed less expensive older style RG-59/U cable instead of more robust RG-6/U cable. Problems could also arise from improper installation of a home network, such as the improper use of splitters with coaxial cable and/or wiring of jacks. The problem may also be pinpointed to a faulty computer networking device.

It should be understood that any of the features described with respect to one of the embodiments described herein may be used with any other of the embodiments described herein without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A system for handling streaming media on customer premises, said system comprising:
    a plurality of compute engines located at said customer premises and having a network interface device port and a customer premises equipment port, wherein said plurality of compute engines are configured for installation between a network interface device and one of a plurality of video destination customer premises equipment;
    a first processing module of a first of the plurality of compute engines configured for:
        receiving a first incoming packet stream;
        processing the first incoming packet stream to generate stream data of the first incoming packet stream; and
        forwarding the stream data of the first incoming packet stream through the network interface device port to a remote location within a service provider's network; and
    a second processing module of a second of the plurality of compute engines configured for:
        receiving a second incoming packet stream;
        processing the second incoming packet stream to generate stream data of the second incoming packet stream;
        forwarding the second incoming packet stream through the customer premises equipment port; and
        transmitting the stream data of the second incoming packet stream through the network interface device port to the remote location.

2. A system for handling streaming media at a customer premises, comprising:
    a plurality of compute engines located at said customer premises having a customer network interface device port and a customer premises equipment port, wherein said plurality of compute engines is are configured for installation between a customer network interface device and one of a plurality of video destination customer premises equipment;
    a first processing module of a first of the plurality of compute engines configured for:
        receiving a first incoming packet stream;
        processing the first incoming packet stream to generate stream data of the first incoming packet stream; and
        forwarding the stream data of the first incoming packet stream through the customer network interface device port to a remote location within a service provider's network; and
    a second processing module of a second of the plurality of compute engines configured for:
        receiving a second incoming packet stream;
        processing the second incoming packet stream to generate stream data of the second incoming packet stream;

forwarding the stream data of the second incoming packet stream through the customer network interface device port to the remote location; and forwarding the second incoming packet stream through the customer premises equipment port.

3. The system of claim 2, wherein said processing, by one of the first processing module and the second processing module, comprises measuring parameters of one of the first incoming packet stream and the second incoming packet stream.

4. The system of claim 2, wherein said processing, by one of the first processing module and the second processing module, includes measuring parameters selected from the group consisting of Media Delivery Index, Delay Factor, Media Loss Rate, checksum errors, packet type identification, packet frequency, packet sizes, packet identifier, Internet Protocol address, User Datagram Protocol port number, stream rates, arrival time stamps, network utilization by stream, cyclic redundancy checks, arrival time distribution, addresses, upper layer protocol types, stream instantaneous bit-rate, average bit-rate, deviation from nominal bit-rate, instantaneous flow rate, instantaneous flow rate deviation, Transport Stream sync loss, Sync byte error, Program Association Table error, PAT error 2, Continuity count error, Program Map Table error, Packet Identifier error, Transport error, Cyclic Redundancy Check error, Program Clock Reference error, PCR repetition error, PCR accuracy error, Presentation Time Stamp error, Network Information Tables error, NIT actual error, NIT other error, Service Information repetition error, Buffer error, Unreferenced PID, System Target Decoder error, SDT actual error, SDT other error, Event Information Table error, EIT actual error, EIT other error, Running Status Table error, Time and Date Table error, NIT other, SDT other, EIT P/F other, EIT schedule other, EIT schedule actual, Next Header, Payload Length, Security Parameters Index (SPI), Sequence Number, Authentication Data, Payload Data, Padding, Pad Length, Next Header, and combinations thereof.

5. The system of claim 2, wherein one of the first processing module and the second processing module is further configured for capturing user data and forwarding the user data through the network interface device port.

6. The system of claim 5, further comprising a user input device actuatable by a user upon experiencing poor media quality.

7. The system of claim 6, wherein said user data are selected from the group consisting of channel change commands, time delay between channel change commands and commencement of channel streaming at the user premises equipment, play commands, rewind commands, pause commands, fast forward commands, stop commands, a log of input device actuation, and combinations thereof.

8. The system of claim 5, wherein one of the first processing module and the second processing module is further configured for processing the user data.

9. The system of claim 5, wherein at least one of the plurality of compute engines comprises a storage module configured for storing at least one of the stream data and the user data.

10. The system of claim 5, wherein at least one of the plurality of compute engines is configured to maintain a log of user commands.

11. The system of claim 2, wherein at least one of the plurality of compute engines is reprogrammable.

12. The system of claim 2, further comprising a remote station communicably coupled to at least one of the plurality of compute engines.

13. The system of claim 12, wherein the remote station is configured to receive at least one of the stream data of the first incoming packet stream and stream data of the second incoming packet stream.

14. The system of claim 12, wherein said remote station is configured to program at least one of the plurality of compute engines.

15. The system of claim 2, wherein the stream data of the first incoming packet stream comprises a copy of the first incoming packet stream.

16. The system of claim 15, wherein the copy comprises a time stamp.

17. The system of claim 15, wherein the copy comprises identification information.

18. The system of claim 15, wherein the copy comprises modified destination information.

19. The system of claim 2, wherein one of the first processing module and the second processing module is configured to test one of the first incoming packet stream and the second incoming packet stream for security parameters.

20. The system of claim 19, wherein one of the first processing module and second processing module is configured to discard packets which fail to meet a predetermined security standard.

21. The system of claim 2, wherein at least one of the plurality of compute engines is configured to forward at least one of the first incoming packet stream and the second incoming packet stream through the customer premises equipment port.

22. The system of claim 21, wherein the second processing module is configured for repairing the second incoming packet stream, and the forwarding the second incoming packet stream comprises forwarding the repaired second incoming packet stream.

23. The system of claim 22, wherein the second processing module is configured for dynamically repairing the second incoming packet stream when the stream data of the second incoming packet stream is indicative of quality below a predetermined threshold.

24. The system of claim 23, wherein the second processing module is configured for repairing the second incoming packet stream using an incoming Forward Error Correction (FEC) flow.

25. The system of claim 24, wherein the second processing module is configured for forwarding stream data of the second incoming packet stream configured to stop the incoming FEC flow when quality is at or above the predetermined threshold.

26. The system of claim 21, wherein the processing module is configured for repairing the second incoming packet stream while the forwarding the second incoming packet stream comprises forwarding the repaired second incoming packet stream.

27. The system of claim 2, wherein the customer premises equipment (CPE) is selected from the group consisting of structured wiring, wireless links, coaxial cable, telephone wiring, electrical power wiring, routers, switches, Set Top Boxes (STBs), bridges, switches, hubs, repeaters, multilayer switches, protocol converters, digital media receivers, proxies, firewalls, multiplexers, network cards, modems, ISDN terminal adapters, line drivers, computers, televisions, monitors, PDAs, Smart Phones, and combinations thereof.

28. The system of claim 2, wherein one of the first incoming packet stream and the second incoming packet stream comprises Internet Protocol packets.

29. The system of claim 2, wherein one of the first incoming packet stream and the second incoming packet stream comprises packets in MPEG-2 transport stream format.

* * * * *